United States Patent [19]

Li et al.

[11] Patent Number: 5,546,981

[45] Date of Patent: Aug. 20, 1996

[54] CHECK VALVE

[75] Inventors: Y. Christian Li; Edward S. Poleshuk; James R. McMordie, all of Greensboro, N.C.

[73] Assignee: Gilbarco, Inc., Greensboro, N.C.

[21] Appl. No.: 372,008

[22] Filed: Jan. 12, 1995

[51] Int. Cl.⁶ .............................. F16K 17/26; F16K 15/02
[52] U.S. Cl. .................................. 137/493.3; 137/543.19; 137/543.21
[58] Field of Search ............................ 137/493.3, 543.19, 137/543.21

[56] References Cited

U.S. PATENT DOCUMENTS

| 886,045 | 4/1908 | Ehrlich | 137/543.19 |
|---|---|---|---|
| 1,938,418 | 12/1933 | Evans | 137/543.19 X |
| 2,603,452 | 7/1952 | Spinney | 137/543.19 |
| 2,710,023 | 6/1955 | Blackford | 137/543.19 |
| 2,755,816 | 7/1956 | Collins . | |
| 2,810,397 | 10/1957 | Olson et al. . | |
| 3,145,724 | 8/1964 | Pelzer | 137/543.21 X |
| 3,244,195 | 4/1966 | Wanner . | |
| 3,524,469 | 8/1970 | Jebe | 137/543.19 |
| 3,633,614 | 1/1972 | Scholz . | |
| 3,830,255 | 8/1974 | Freiheit | 137/543.19 |
| 3,913,615 | 10/1975 | Cooper | 137/543.19 |
| 4,648,369 | 3/1987 | Wannenwetsch | 137/493.3 X |
| 5,062,451 | 11/1991 | Vadasz et al. . | |
| 5,146,949 | 9/1992 | Retzloff et al. . | |
| 5,176,172 | 1/1993 | Ackroyd . | |

FOREIGN PATENT DOCUMENTS 1456510   9/1966   France .............. 137/543.19

Primary Examiner—John Rivell
Attorney, Agent, or Firm—Shefte, Pinckney & Sawyer

[57] ABSTRACT

A check valve for a metering device having a negligible pressure drop thereacross includes a valve seat defining an inlet flow region, an open support frame projecting outwardly from the valve seat to define an outlet flow region having a predetermined flow area greater than the flow area of the inlet flow region and a valve member slidably mounted to the support frame and biased thereagainst for reciprocal movement between a flow blocking position and a flow sustaining position.

7 Claims, 2 Drawing Sheets

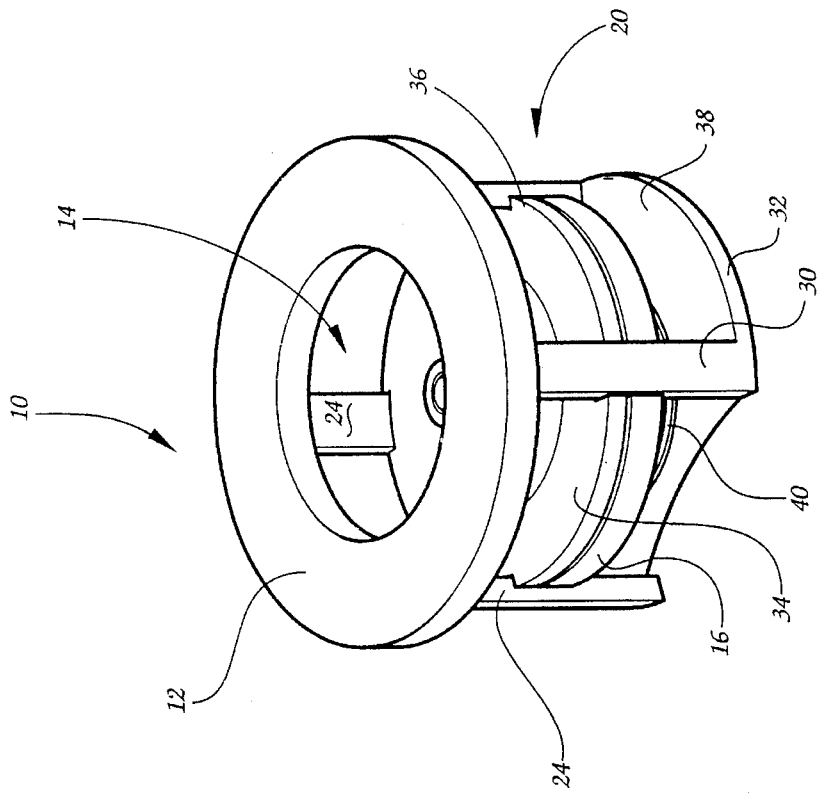
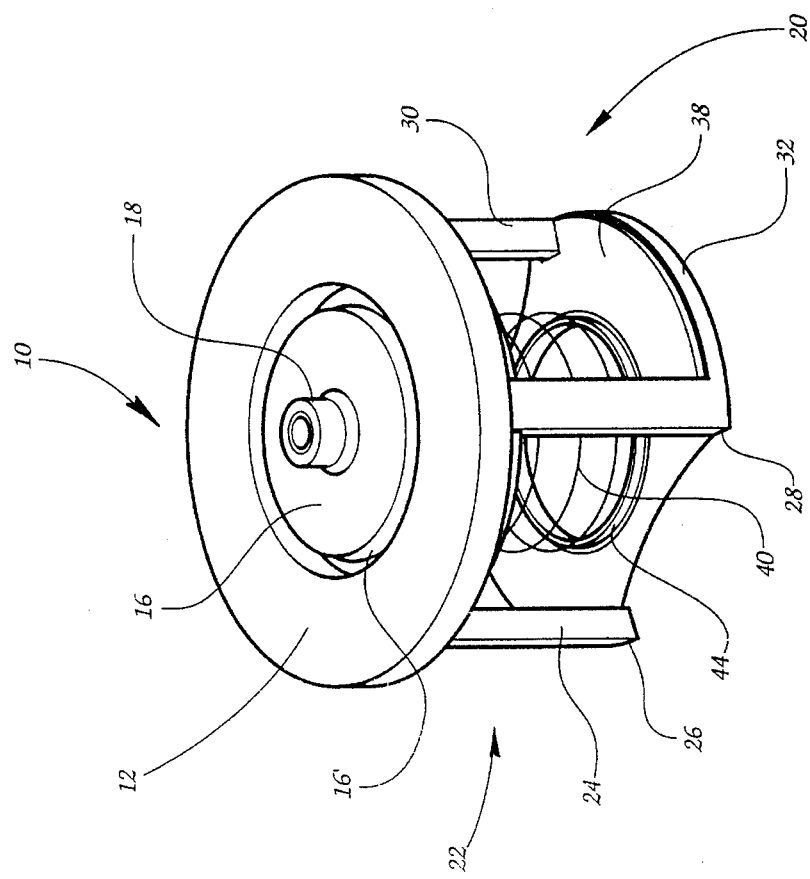

CHECK VALVE

BACKGROUND OF THE INVENTION

The present invention relates broadly to check valves and, more particularly, to a check valve, primarily for use with a metering device wherein the check valve has a negligible pressure drop thereacross.

Fueling stations for motor vehicles, including both fuel dispensers and fuel pumps, are precisely metered devices with the metering being federally regulated. These pumps or dispensers include a metering device through which fuel being dispensed must flow. Once the fuel delivery is halted, fluid flow through the metering device should immediately cease. This cessation of flow is caused by the meter or a solenoid valve disposed within the metering device, and the check valve assures that there is no reversal of fluid flow.

A check valve disposed within the metering device should have a negligible pressure drop thereacross during flow operation and should close rapidly, without binding. Further, it is desirable that the valve be lightweight, as well as being easy to manufacture and assemble. Heretofore, such check valves were difficult to manufacture and were characterized by a heavy casing. Further, the check valves had measurable pressure drop characteristics for which compensation was required by the metering device.

SUMMARY OF THE INVENTION

It is accordingly an object of the present invention to provide a check valve which solves the aforesaid problems. More specifically, it is an object of the present invention to provide a check valve for a metering device having a negligible pressure drop thereacross. It is another object of the present invention to provide such a check valve that is easy to assemble and manufacture and is lightweight.

To that end, a check valve having a negligible pressure drop thereacross includes a valve seat defining an inlet flow region having a predetermined flow area; a support frame projecting outwardly from the valve seat and defining an outlet flow region having a predetermined flow area greater than the area of the inlet flow region. Further, the present invention includes a valve member, or poppet, slidably mounted to the support frame for reciprocal movement between a flow blocking position in abutment with the valve seat and a flow sustaining position away from the valve seat. A retainer is mounted to the frame and a biasing spring is mounted intermediate the retainer and the valve member for biasing the valve member against the valve seat in a normally closed configuration and for biasing the retainer into contact with the support frame. Preferably, the gasket is mounted to the valve member for sealing abutment against the valve seat when the valve member is biased against the valve seat in the normally closed configuration. The valve member preferably includes a convex edge surface for enhanced flow thereacross. Preferably, a pressure relief valve is disposed substantially in the center of the valve member.

It is preferred that the frame include a first frame portion having at least two generally elongate rail members projecting generally parallelly outwardly a predetermined distance from the valve seat with the rail members being joined by a retainer support member extending from a distal end of a first rail member to a distal end of a second rail member in generally perpendicular alignment with the rail members. Further, the frame structure includes a second frame portion structurally similar to the first frame portion and mounted to the valve seat at a predetermined spacing from the first frame portion with the retainer extending between the first frame portion and the second frame portion in abutment with the retainer support members with the retainer being biased thereagainst by the spring.

It is further preferred that the retainer include two flanges projecting outwardly from opposing sides thereof, each flange being configured to fit within the spacing between the rail members for abutment against the retainer support members.

By the above, the present invention provides a lightweight check valve having a negligible pressure drop thereacross. Further, the valve member does not tend to stick open as with previous designs which had lengthwise space constraints which prevented the use of alignment or directing rail members. In addition, the relatively thin design of the valve member prevents binding during valve member motion, while the biasing spring substantially prevents lateral motions of the valve member.

BRIEF DESCRIPTION OF THE DRAWINGS

FIG. 1 is a perspective view of a check valve for a metering device according to the preferred embodiment of the present invention illustrating the valve in its normally closed position;

FIG. 2 is a perspective view of the check valve illustrated in FIG. 1 showing the valve in an open position.

DESCRIPTION OF THE PREFERRED EMBODIMENT

Figure 3:
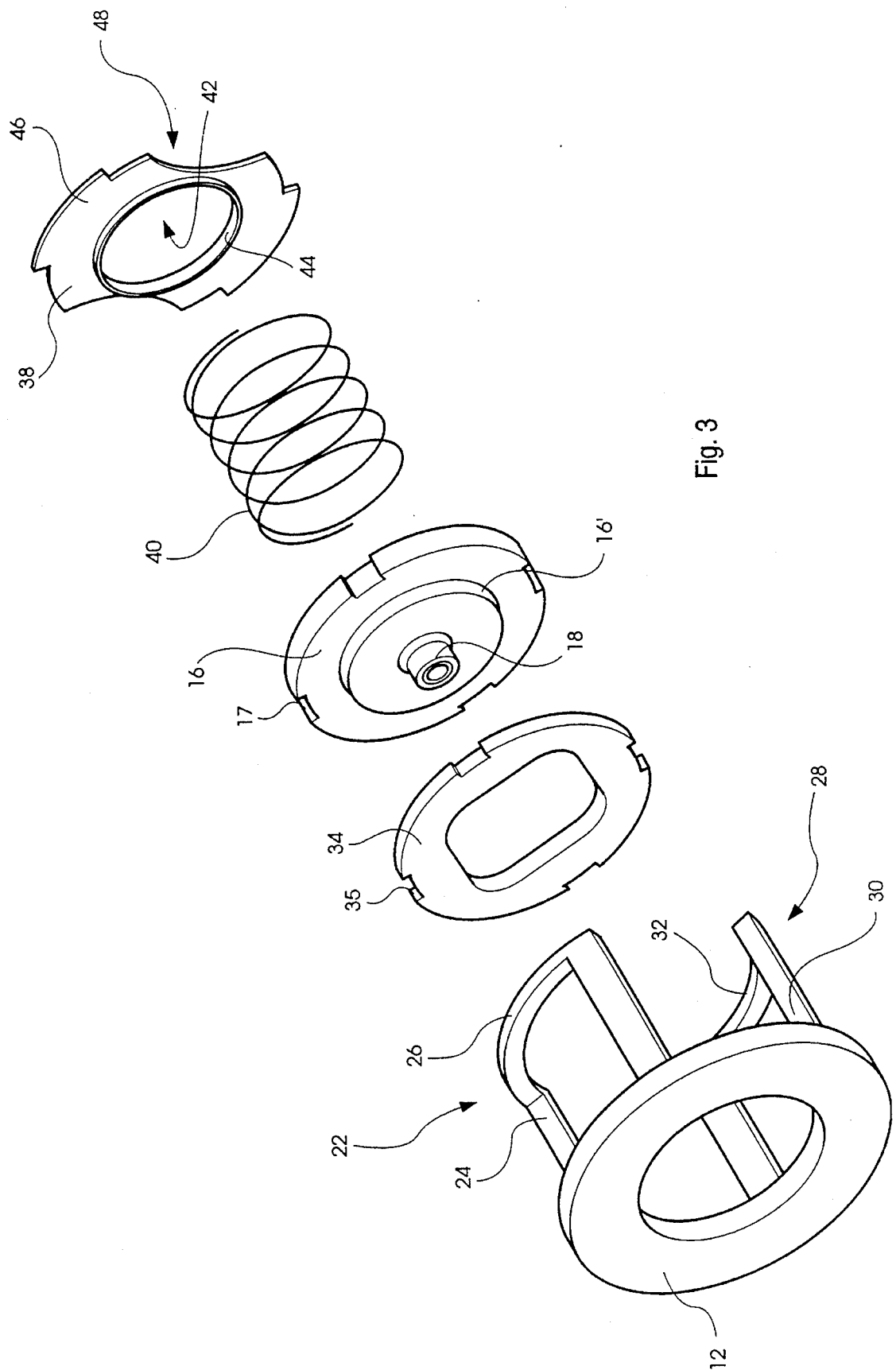
FIG. 3 is an exploded view of the check valve illustrated In FIG. 1.

Turning now to the drawings, and more particularly to FIG. 1, a check valve for a metering device according to the present invention is illustrated generally at 10 and includes a washer-like valve seat 12 defining a circular flow inlet region 14. The flow inlet region 14 is best seen in FIG. 2. A generally circular valve member 16, or poppet, is configured for abutment against the valve seat 12, as will be explained in greater detail hereinafter. The valve member 16 includes a generally cylindrical projection 18 disposed substantially in the center thereof and having a pressure relief valve (not shown) disposed therein. The pressure relief valve is provided to prevent destruction of the valve should pressure in a flow blocking direction rise to an undesirable level, as well as protecting other dispenser components, e.g., the meter itself. Further, the valve member 16 includes a convex surface edge portion 16' to enhance flow thereacross. A gasket 34 which has the same outer dimensions as the valve member 16 is positioned against the valve member 16 for sealing the valve 10 when the valve member 16 is against the valve seat 12. Both the valve member 16 and the gasket 34 include four evenly spaced notches, designated 17 and 35, respectively, which are configured for retention and alignment of the valve member 16 as will be described in greater detail hereinafter.

In order to support the valve member 16, a frame structure 20 is configured integrally with the valve seat 12 and projects downwardly therefrom. The frame structure 20 includes two frame portions 22,28 which are mirror images of one another and preferably formed integrally with the valve seat 12. A first frame portion 22 includes a pair of downwardly projecting rails 24 which are joined by a curved cross member 26 as best seen in FIG. 3, where it is to be noted that the curvature of the cross member 26 substantially matches the curvature of the washer-like valve seat 12. A similar frame structure 28 including rails 30 and a curved cross member 32 is formed integrally with the valve seat 12 and projects outwardly from the valve seat 12 at a position opposite that of the first frame portion 22 such that the rails 24,30 extend parallelly and in general alignment. As best seen in FIG. 2, and as will be explained in greater detail hereinafter, the open spacings between the rails 24,30 define flow outlet openings 36 which extend in an area bounded by the valve seat 12, the rails 24,30, and the valve member gasket 34 when the valve is in an open condition as seen in FIG. 2. The outlet flow openings 36 provide a flow outlet of substantially greater size than the inlet opening 14. Accordingly, pressure drop across the valve is negligible.

The valve member 16 is retained in a slidable disposition intermediate the frame portions 22,28 by a retainer 38 and a biasing spring 40, with the frame rails 24,30 disposed within the notches 17. The biasing spring 40 controls the "cracking pressure" i e the pressure required to unseat the valve member and by changing spring biasing rates, the "cracking pressure" may be controlled. With reference to FIG. 3, the retainer 38 configured as a portion of a disk having an aperture 42 formed therein. The aperture 42 is bounded by a raised flange 44 which centers and retains the spring 40 as will be explained in greater detail presently. Two generally curved flanges 46 project outwardly from opposite sides of the retainer 38 and are configured for abutment against the cross members 26,32 of the frame portions 22,28. For ease of handling during manufacture, two curved indentions 48 are formed in the retainer oppositely from the flanges 46. These indentions provide a fingerhold during assembly. As seen in FIG. 1, the retainer 38 fits intermediate the frame portions 22,28 and a biasing spring is disposed intermediate the valve seat 16 and the retainer 38. The biasing spring 40 is centered and maintained in alignment by the circular, upwardly projecting flange 44 formed on the retainer 38 and aligned by a raised portion (not shown) on the back of the valve member 16. The retainer 38 may be formed as part of the meter, although this is a less desirable configuration.

The structure of the valve 10 provides for ease of manufacture. With reference to FIG. 3, the gasket 34 is fitted to the valve seat 16 with the gasket rail notches 35 in alignment with the valve seat rail notches 17. The valve member 16 is then inserted between the frame portions 22,28 at an angular disposition such that first rail notches 17 are disposed adjacent first rails 24 after which the valve seat is rotated partially about its radial axis to bring a second set of rail notches 17 into a disposition adjacent the second rails 30 with the gasket 34 directed toward the valve seat 12. The biasing spring 40 is then inserted against the valve seat 12 and the retainer 38 is then directed against the valve spring 40 with the support flange 44 in the helical coil of the spring 40.

Continuing assembly with a maneuver similar to insertion of the valve member 16, the retainer 38 is directed inwardly between the frame portions 22,28 with a first flange portion 46 extending intermediate a first pair of rails 24. Compression of the spring 40 with angular direction of the retainer 38 results in a second flange portion 46 projecting inwardly intermediate second rails 30 to the extent that, upon release of the retainer 38, the biasing spring 40 forces the retainer 38 outwardly so that the flange portions 46 abut the cross members 26,32 to support the valve in an assembled condition. The valve 10 of the present invention may be disassembled in a similar fashion. Accordingly, due to the ease of assembly and disassembly, gaskets may be replaced, weak springs may be replaced, or other broken structures may be easily replaced should the valve ever fail in use.

In operation, and as best seen in FIGS. 1 and 2, fluid flow enters the inlet 14 forcing the valve member 16 away from the valve seat 12 to allow flow to continue through the outlet portions 36 defined by the open frame structure of the valve 10 and the valve member 16. Once flow has ended, or should flow occur in the opposite direction, the valve member 16 is forced upwardly against the valve seat 12 aided by the biasing spring 40 to seal the valve 10. As previously stated, a pressure relief valve (not shown) is provided should back pressure exceed a predetermined level. By the above, the present invention provides a check valve which is characterized by virtually no pressure drop thereacross during flow operation and which is easily assembled and disassembled.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A check valve having a negligible pressure drop thereacross, said check valve comprising:

a valve seat defining an inlet flow region having a predetermined flow area;

a support frame projecting outwardly from said valve seat and defining an outlet flow region having a predetermined flow area greater than the area of said inlet flow region said support frame including a first frame portion having at least two generally elongate rail members projecting generally parallelly outwardly a predetermined distance from said valve seat, said rail members being joined by a retainer support member extending from a distal end of a first rail member to a distal end of a second rail member in generally perpendicular alignment with the rail members and a second frame portion structurally similar to said first frame portion and mounted to said valve seat at a predetermined spacing from said first frame portion;

a valve member slidably mounted to said support frame for reciprocal movement between a flow blocking position in abutment with said valve seat and a flow sustaining position away from said valve seat;

a retainer mounted to said frame and extending between said first frame portion and said second frame portion in abutment with said retainer support members, said retainer including two flanges projecting outwardly from opposing sides thereof, each flange being configured to fit within said spacing between said first portion rail members and said spacing between said second portion rail members for abutment against said retainer support members;

a biasing spring mounted intermediate said retainer and said valve member for biasing said valve member against said valve seat in a normally closed configuration.

2. A check valve according to claim 1 and further comprising a gasket member mounted to said valve member for sealing abutment against said valve seat when said valve member is biased against said valve seat in said normally closed configuration.

3. A check valve according to claim 1 wherein said valve member includes convex edge surface for enhanced flow thereacross.

4. A check valve according to claim 1 and further comprising a pressure relief valve disposed substantially in the center of the valve member.

5. A check valve for a metering device having a negligible pressure drop thereacross, said check valve comprising:

a valve seat defining an inlet flow region having a predetermined flow area;

an open frame formed integrally with said valve seat including a first frame portion having at least two generally elongate rail members projecting generally parallelly outwardly a predetermined distance from said valve seat and at a predetermined spacing from one another, said rail members being joined by a cross member extending from a distal end of a first rail member to a distal end of a second rail member, said open frame including a second frame portion configured similarly to said first frame portion and spaced a predetermined distance therefrom, said open frame defining an outlet flow region having a predetermined flow area greater than the area of said inlet flow region;

a valve member slidably mounted to said frame for reciprocal movement between a flow blocking position in abutment with said valve seat and flow sustaining position away from said valve seat;

a retainer member mounted to said frame, said retainer including at least two flanges projecting outwardly from opposing sides thereof for abutment with said frame cross members with said retainer member extending therebetween; and a biasing spring mounted intermediate said retainer and said valve member for biasing said valve member against said valve seat in a normally closed configuration and for biasing said retainer against said cross members.

6. A check valve according to claim 5 and further comprising a gasket member mounted to said valve member for sealing abutment against said valve seat when said valve member is biased against said valve seat in said normally closed configuration.

7. A check valve according to claim 5 wherein said valve member includes convex edge surface for enhanced flow thereacross.

* * * * *